United States Patent [19]
Hernandez

[11] Patent Number: 5,485,940
[45] Date of Patent: Jan. 23, 1996

[54] BREAD BOXES WITH SLICE DISPENSING MECHANISMS

[76] Inventor: Rickie L. Hernandez, 48617 36th Ave., Bangor, Mich. 49013

[21] Appl. No.: 225,764

[22] Filed: Apr. 11, 1994

[51] Int. Cl.⁶ .................................................. B65H 3/00
[52] U.S. Cl. ............................ 221/192; 221/279; 312/71
[58] Field of Search ....................... 221/195, 196, 221/191, 192, 232, 246, 279, 282; 312/61, 71, 272

[56] References Cited

U.S. PATENT DOCUMENTS 2,771,979  11/1956  Lenhart ................................. 221/196
5,152,590  10/1992  Dukes ................................... 312/71
5,191,996   3/1993  Jenkins ................................. 312/61

Primary Examiner—Kenneth Noland

[57] ABSTRACT

A bread box for storing and dispensing such sliced bread by means of an inverting action applied to any wrapper in which bread may be packaged resulting in one or more slices dispensed per activation of a sliced bread dispensing unit, as well as the concept of inverting such bread wrappers to accomplish the task of dispensing sliced bread.

3 Claims, 4 Drawing Sheets

1

BREAD BOXES WITH SLICE DISPENSING MECHANISMS

BACKGROUND OF THE INVENTION

1. Field of the Invention

The present invention relates to new and improved bread boxes with slice dispensing mechanisms and, more particularly, pertains to storing loaves of sliced bread and to dispensing the bread one slice at a time.

2. Description of the Prior Art

The use of bread boxes is known in the prior art. More specifically, storing and slicing loaves of bread and dispensing such sliced bread one slice at a time heretofore devised and utilized for the purpose of dispensing slices of bread are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 4,000,831 a sliced bread dispenser.

U.S. Pat. No. 4,083,895 discloses a device for keeping bread fresh.

U.S. Pat. No. 4,905,869 discloses an apparatus for safe storage and dispensation of sliced bread.

U.S. Pat. No. 5,152,590 discloses a device for storing and automatically dispensing bread.

U.S. Pat. No. Des. 268,560 discloses the design of a bread storage container or the like.

In this respect, the bread boxes with slice dispensing mechanisms according to the present invention substantially departs from the conventional concepts and designs of the prior art, and in doing so provides an apparatus primarily developed for the purpose of bread boxes with slice dispensing mechanisms.

Therefore, it can be appreciated that there exists a continuing need for new and improved bread boxes with slice dispensing mechanisms which can be used for bread boxes with slice dispensing mechanisms. In this regard, the present invention substantially fulfills this need.

SUMMARY OF THE INVENTION

In view of the foregoing disadvantages inherent in the known types of storing and slicing loaves of bread and dispensing such sliced bread one slice at a time now present in the prior art, the present invention provides an improved bread boxes with slice dispensing mechanisms. As such, the general purpose of the present invention, which will be described subsequently in greater detail, is to provide a new and improved bread boxes with slice dispensing mechanisms and method which has all the advantages of the prior art and none of the disadvantages.

To attain this, the present invention essentially comprises a new and improved bread box for storing sliced bread and for dispensing such sliced bread one or more slices at a time comprising, in combination: four side walls oriented in a rectangular configuration about a central vertical axis, a lower base coupling the lateral edges of the side walls, and a lid with a hinge coupled to the top edge of one of the side walls and pivotable from a raised upper orientation where dispensing bread can be received and a closed orientation combined with the use of the bread wrapper as an air resistant lining for sealing the bread. A bail located and hinged atop the invertor collar, the bail being a hinged clamp for the purpose of securing the bread wrapper fast to the invertor collar; a pair of parallel worm gears extending parallel with respect to the axis of the box gearing associated with the work gears capable of spiraling through guides on two sides of the invertor collar, the gears reciprocate the invertor collar and enclamped bread wrapper inverting the wrapper and dispensing slices of bread from within; a pair of planet gears at the bottom edge of each worm gear with a sun gear rotatable about the axis of the box to rotate the planet gears; and a power source coupled to the sun gear for rotating the sun gear whereby rotation of the sun gear will rotate the sun gear, planet gears, parallel worm gears, and reciprocate the invertor collar and enclamped bread wrapper edges to dispense or return one or more slices of bread to the dispenser.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved bread boxes with slice dispensing mechanisms which have all the advantages of the prior art for storing sliced loaves of bread and dispensing such sliced bread one or more slices at a time and none of the disadvantages.

It is another object of the present invention to provide new and improved bread boxes with slice dispensing mechanisms which may be easily and efficiently manufactured and marketed.

It is further object of the present invention to provide new and improved bread boxes with slice dispensing mechanisms which are of durable and reliable constructions.

An even further object of the present invention is to provide new and improved bread boxes with slice dispensing mechanisms which are susceptible of a low cost of manufacture with regard to both materials and labor, and which accordingly are then susceptible of low prices of sale to the consuming public, thereby making such bread boxes with slice dispensing mechanisms economically available to the buying public.

Still yet another object of the present invention is to provide new and improved bread boxes with slice dispensing mechanisms which provide in the apparatuses and methods of the prior art some of the advantages thereof, while simultaneously overcoming some of the disadvantages normally associated therewith.

Lastly, it is an object of the present invention to provide new and improved bread box for storing and dispensing such sliced bread by means of an inverting action applied to any wrapper in which bread may be packaged resulting in one or more slices dispensed per activation of a sliced bread dispensing unit, as well as the concept of inverting such bread wrappers to accomplish the task of dispensing sliced bread.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
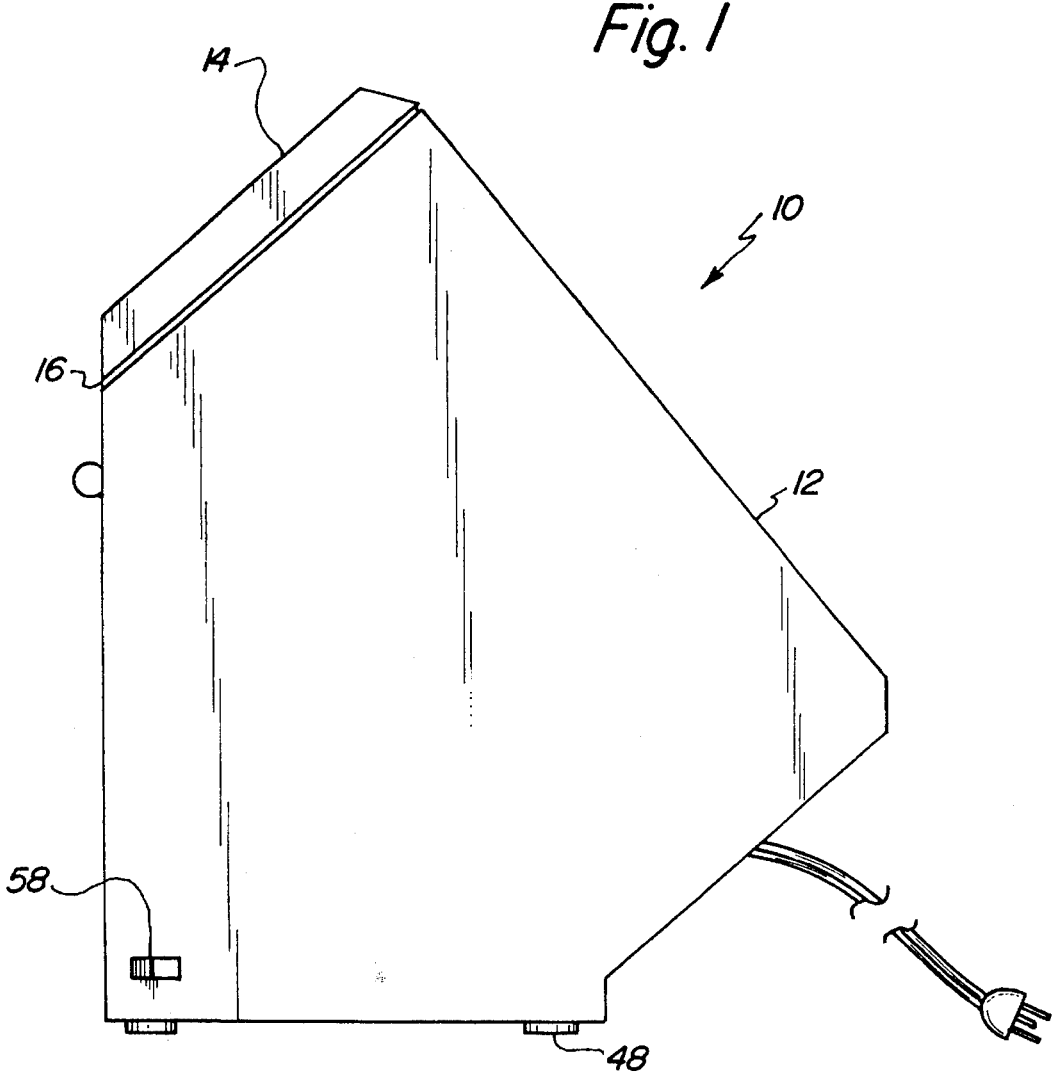
FIG. 1 is a side elevational view of the new and improved preferred embodiment of the bread boxes with slice dispensing mechanisms constructed in accordance with the principles of the present invention.
Figure 2:
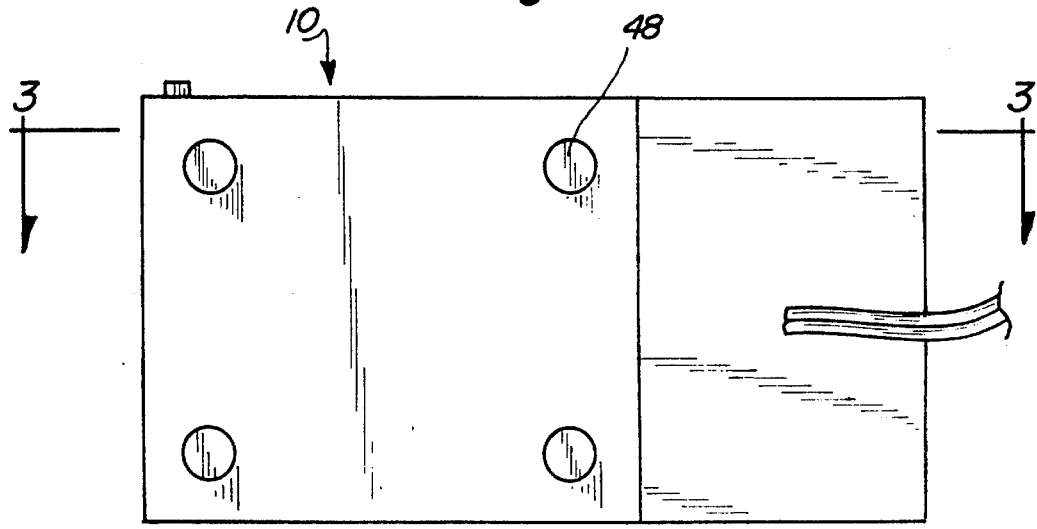
FIG. 2 is a bottom elevational view of the bread box with slice dispensing mechanisms shown in FIG. 1.

With reference now to the drawings, and in particular to FIG. 1 thereof, the preferred embodiment of the new and improved bread boxes with slice dispensing mechanisms embodying the principles and concepts of the present invention and generally designated by the reference numeral 10 will be described.

Figure 3:
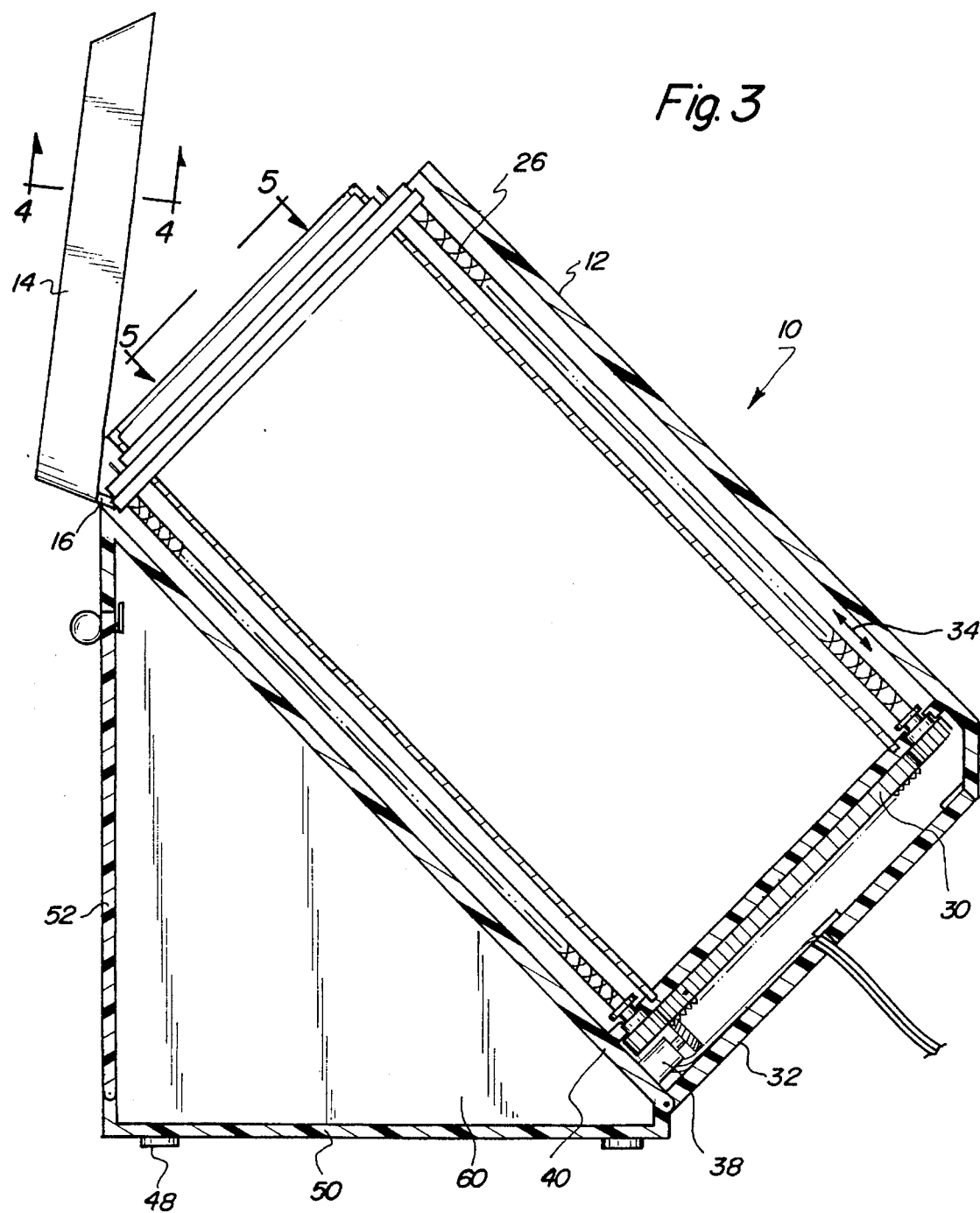
FIG. 3 is a cross-sectional view taken along line 3—3 of FIG. 2.

The present invention is a bread box 10 for storing and dispensing stored sliced bread from within by means of an inverting action applied to any wrapper in which bread may be packaged. This results in one or more slices dispensed per activation of a sliced bread dispensing unit. The invention also includes the concept of inverting such bread wrappers to accomplish the task of dispensing sliced bread. Note FIG. 3.

The primary component of the present invention is a container 12 with an upper end. A deep dish type lid 14 is next provided to cover the protruding inner bread box and inverting collar. A hinge 16 couples the lid to the container. Note FIG. 3.

A rubberized retainer bail 20 on a pair of hinges are molded to the bread wrapper inverting collar 22. This assembly is the method in which the bread wrapper edges 24 are secured so that the wrapper may be inverted.

Figure 5:
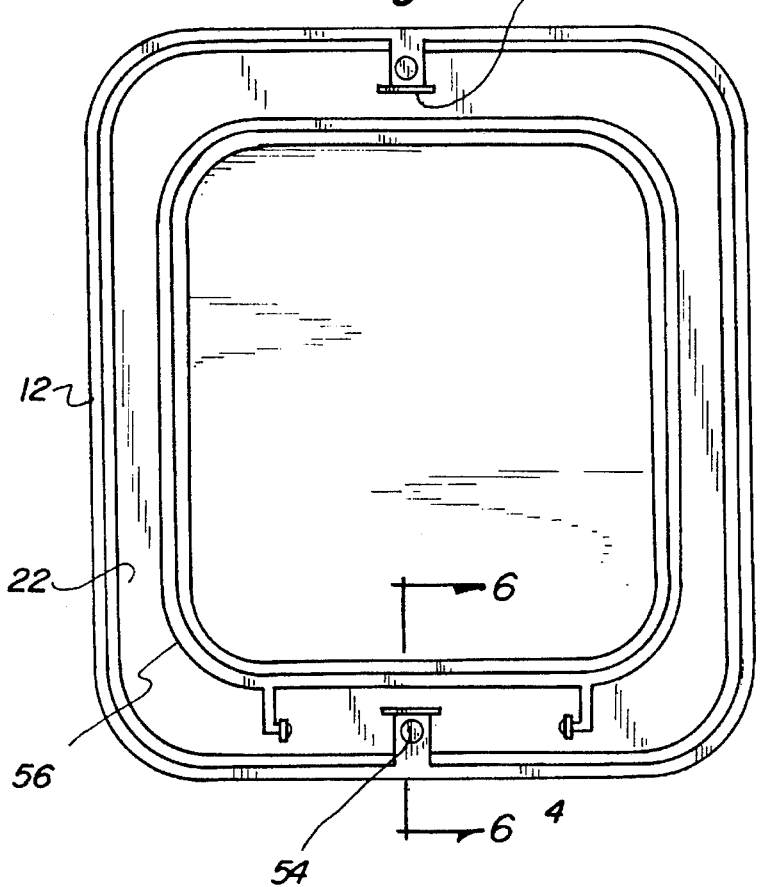
FIG. 5 is a plan view of the central portion of the device taken along line 5—5 of FIG. 3.
Figure 6:
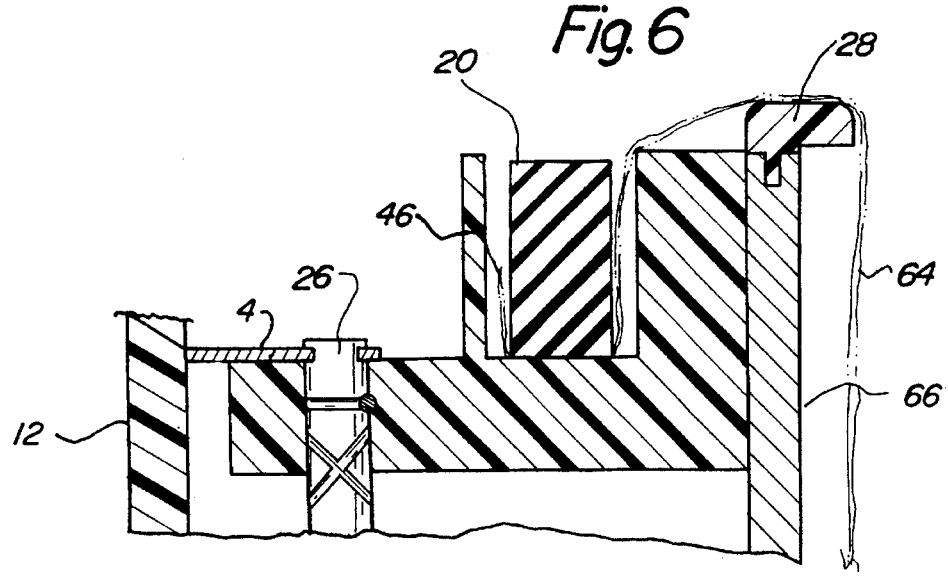
FIG. 6 is a cross-sectional view taken along line 6—6 of FIG. 5.

The bread wrapper inverting collar 22 is a surface which one would fold the edges of the bread wrapper down over in order to be secured by the retainer bail. Note FIGS. 5 and 6.

A plastic support 4 is provided. Such support is stemming from the outer enclosure inward Just far enough to accomplish supporting of the inverting collar drive rod/worm gear 26. Note FIG. 6.

The inverting collar drive rod/worm gear 26 features spiralling grooves much like the ones you can find on a river fishing reel or better known as a bait caster that has the level spool and string guide set up. With this type of worm gear one could continue cranking the crank in one direction of rotation and once the inverting collar has reached the bottom of the bread box it will automatically reverse its direction of travel with continued cranking in that same direction of rotation. This simple method will also prevent damage to the drive gears or an electric motor as where other drive method may allow the invertor collar to be run up or down to a damaging extreme. Note FIGS. 6 and 8.

Flange 28 is shown in a profile view and protrudes vertically and horizontally as one might picture an angle iron surrounding the bread box. It is made, preferably, from plastic. This makes up a larger portion of the invertor collar. There are two points on the invertor collar that will receive the invertor drive rod/worm gear. These two points are designed in such a way that they provide the counterpart for gear 26 so as to function as described above. The same time this design will not interfere with the necessary travel distance of the invertor collar. Note FIG. 6.

Figure 4:
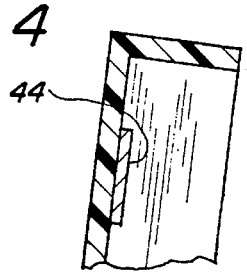
FIG. 4 is a cross-sectional view taken along lines 4—4 of FIG. 3.

A steel edge cap 28 caps the rim of the inner bread box only. The purpose for this is to ensure a smooth surface over which the bread wrapper can be inverted as well as being a necessary part for accomplishing a tight magnetic seal as is the magnetic strip 44 in the top of the dispenser lid. Note FIG. 3, 4 and 6.

The drive gears 30 are necessary to perform the task of dispensing sliced bread. The largest gear shown here has teeth on the outer edges as well as teeth on the bottom. Note FIG. 3.

A pivoted crumb clean out door 32 is on the bottom of the container 12. It has an appropriate latch for locking and a hinge for cleaning out crumbs, Note FIG. 3 and 8.

The hollow area 34 is located between the inner bread box and the outer casting through which the invertor collar will travel. This hollow will also allow any bread crumbs to fall through to the clean out door area. Note FIG. 3.

Figure 7:
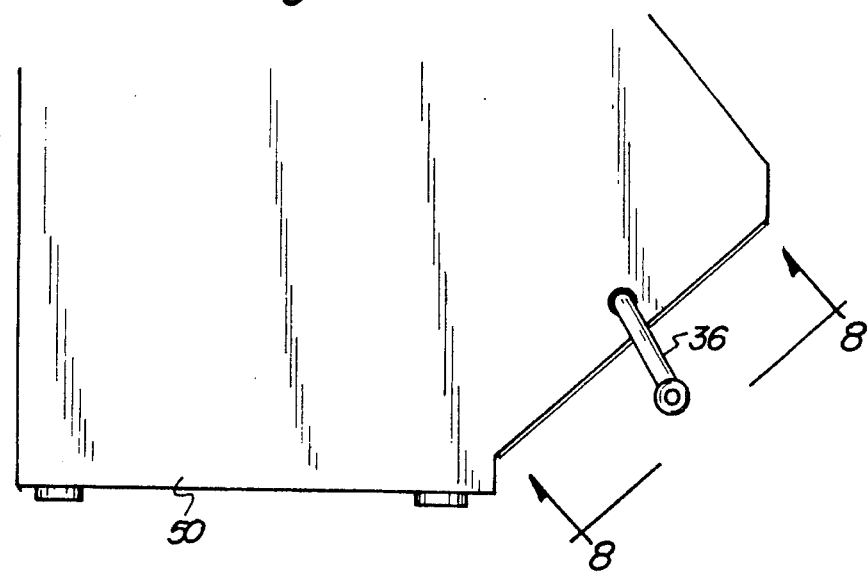
FIG. 7 is an enlarged side elevational view of one lower corner of the device shown in FIG. 1.
Figure 8:
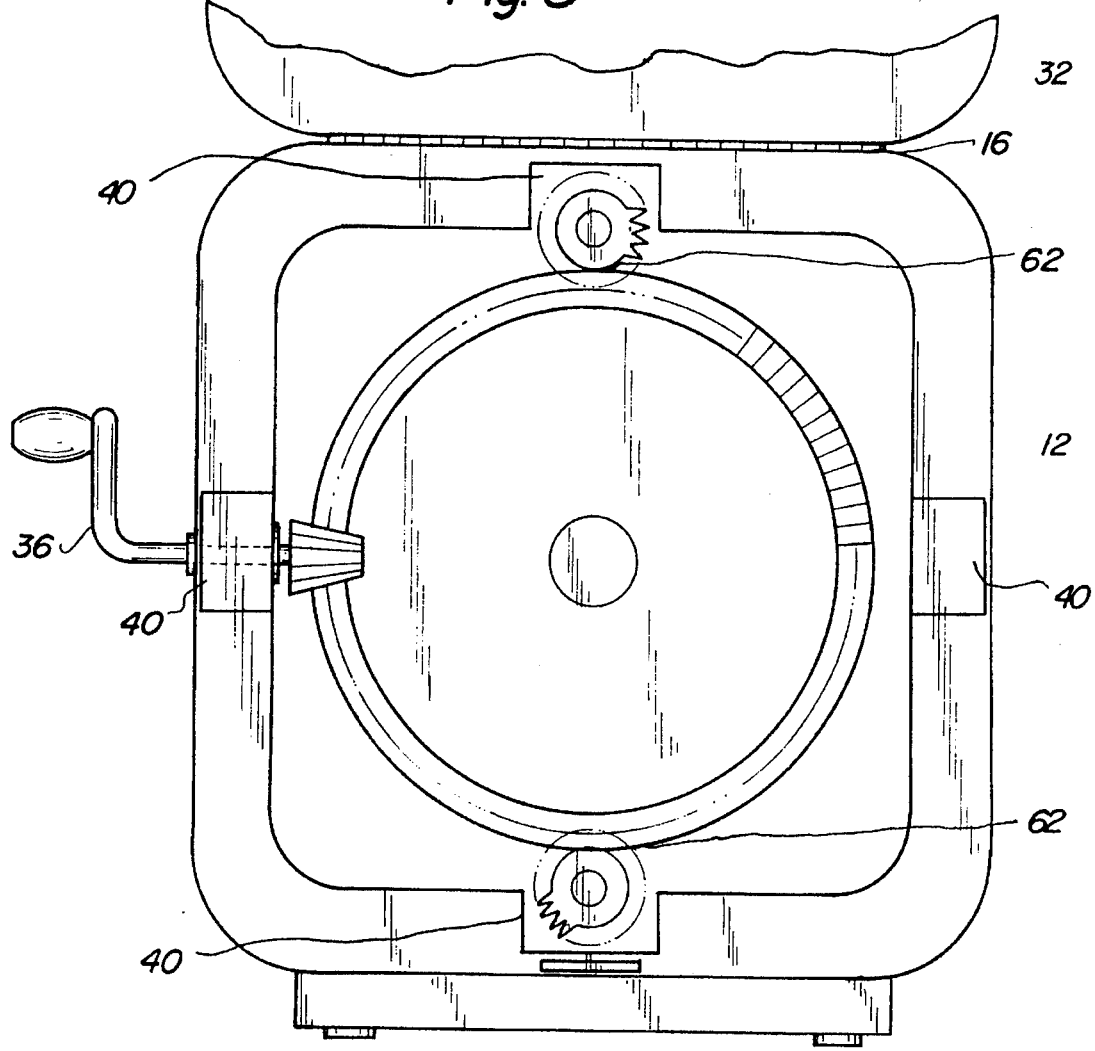
FIG. 8 is a bottom view taken along lines 8—8 of FIG. 7.

A hand crank 36 is on the manually operated version of FIGS. 7 and 8. This dispenser can easily be electrically operated. The electric version with a motor 38, preferably offered to consumers if manufacturers so choose. Note FIGS. 7 and 8 and 1.

Four plastic supports 40 span from the base of the inner bread box and are anchored to the inside wall of the outer casing 12, these supports, suspend the bread box within the outer casing which allows a hollow through which the invertor collar will travel as well as a hollow where necessary gears will be located at the base of the unit. Two of the four support tabs will serve as supports for guides for the invertor collar drive rods/worm gears. Note FIGS. 3 and 8.

An outer casing 42 is provided for the bread dispenser 10. Note FIG. 5.

A wide and near flat magnetic gasket strip 44 is glued in the top of the bread dispenser lid. This gasket is shaped to cover the steel rim capping the inner bread box. Note FIG. 6.

A very important plastic shield 46 is molded onto the top side of the invertor collar to prevent the bread wrapper from getting caught up in the invertor collar drive rod. This shield stands vertical to a height equal to that of the vertical portion of the invertor collar. The shield is positioned to avoid making contact with the invertor collar drive gears support 4 which would be part of the outer casing 12 at the top of this unit. Note FIG. 5 and 6.

Rubber caps 48 slightly protrude below the base of the unit to cap the plastic legs. Note FIGS. 1, 2, 3, 7 and 8.

The base 50 of the unit is used to keep the necessary angle of 50 to 60 degrees tilt of the bread storage box and keep this unit free of upper cabinet interference. This design will create a hollow beneath the unit which may be utilized as a small storage for crackers, napkins, etc. A door 52 is formed with a hinge at its lower end and a latch at its upper end for entrance to such storage. Note FIG. 3.

The tip 54 of the worm gear/invertor collar drive rods is where they are supported at the top of the external casing. These would not necessarily have to be visible when the dispenser door is opened. Note FIG. 5 and 6.

The area 56 is should have a small clearance of approximately ¼ inch to allow for the invertor collar to travel with the excess bread wrapper hanging off. The excess wrapper would no longer be visible once the unit has been activated. Note FIG. 5.

The hinge assembly 16 is of a type of slot and pin configuration that will allow the lid and magnetic gasket to seat properly, and if possible at the same time keep the lid when opened in at a level suitable to act as a tray/catch tray, should one dispense too many slices of bread and cause a stack to slide down. Note FIG. 3.

A button 58 is provided for the electric models. This electric application requires a reversible motor and switch to allow one to replace any excess bread inadvertently dispensed. Note FIG. 1.

Other significant features include a hollow area 60 which could be used for storage. The drive gears/planet and sun gears 62 for effecting the movement of the operating elements of the device 10, the bread wrapper 64 and the inner bread box wall 66.

As can be understood from the foregoing, the present invention includes a new and improved bread box for storing sliced bread and for dispensing such sliced bread one or more slices at a time comprising, in combination: four side walls oriented in a rectangular configuration about a central vertical axis, a lower base coupling the lateral edges of the side walls, and a lid with a hinge coupled to the top edge of one of the side walls and pivotable from a raised upper orientation. A bail located and hinged atop the invertor collar, the bail being a hinged clamp for the purpose of securing the bread wrapper fast to the invertor collar. A pair of parallel work gears extending parallel with respect to the axis of the box gearing associated with the worm gears capable of spiraling through guides on two sides of the invertor collar, the guides being necessary counter parts of the worm gears whereby rotation of the worm gears reciprocate the invertor collar and enclamped bread wrapper inverting the wrapper and dispensing slices of bread from within. A box to rotate the planet gears; and a power source coupled to the sun gear for rotating the sun gear whereby rotation of the sun gear will rotate the sun gear, planet gear and parallel worm gears to move the wrapper and dispense or recall the bread slices continuously until the power button is released.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved bread box for storing sliced bread and for dispensing or replacing such sliced bread one or more slices at a time comprising, in combination:

four side walls oriented in a rectangular configuration about a central vertical axis, a lower base coupling the lateral edges of the side walls, and a lid with a hinge coupled to the top edge of one of the side walls and pivotable from a raised upper orientation having a steel rim for receiving a magnetic gasket located in the top of the outer casing's lid;

a bail mounted on the top side of an invertor collar and hinged to swing in the same direction as the lid on the outer casing, the bail and collar capable of reciprocating along the axis, the bail and collar also capable of enclamping the open end of a bread wrapper;

a pair of parallel worm gears extending parallel with respect to the axis of a box gearing associated with the worm gears capable of receiving collar guides, part of the invertor collar and bail assembly whereby when the guides are on the invertor collar follow a spiraling groove in the worm gears as they are rotated the invertor collar will move up or down to the desired number of bread slices;

a pair of planet gears at the bottom edge of each worm gear with a sun gear rotatable about the axis of the box to rotate the planet gears; and a power source coupled to the sun gear for rotating the sun gear whereby rotation of the sun gear will rotate the planet gears, the parallel worm gears to move the invertor collar upward or down as will the enclamped bread wrapper downward from over the top rim of the inner bread box thus inverting the wrapper and exposing the contents.

2. The device as set forth claim 1 wherein the power source is an electric motor.

3. The device as set forth in claim a wherein the power source is a hand crank.

* * * * *